July 7, 1925.

C. W. HAZELETT 1,545,051

BATTERY BRIDGE TERMINAL LUG CASTING MACHINE

Filed Feb. 26, 1921   3 Sheets-Sheet 1

INVENTOR
Clarence W. Hazelett,
By Oaks & Maerklin,
ATTORNEYS

July 7, 1925.

C. W. HAZELETT 1,545,051

BATTERY BRIDGE TERMINAL LUG CASTING MACHINE

Filed Feb. 26, 1921    3 Sheets-Sheet 2

INVENTOR
Clarence W. Hazelett,
By Baker & Macklin,
ATTORNEYS

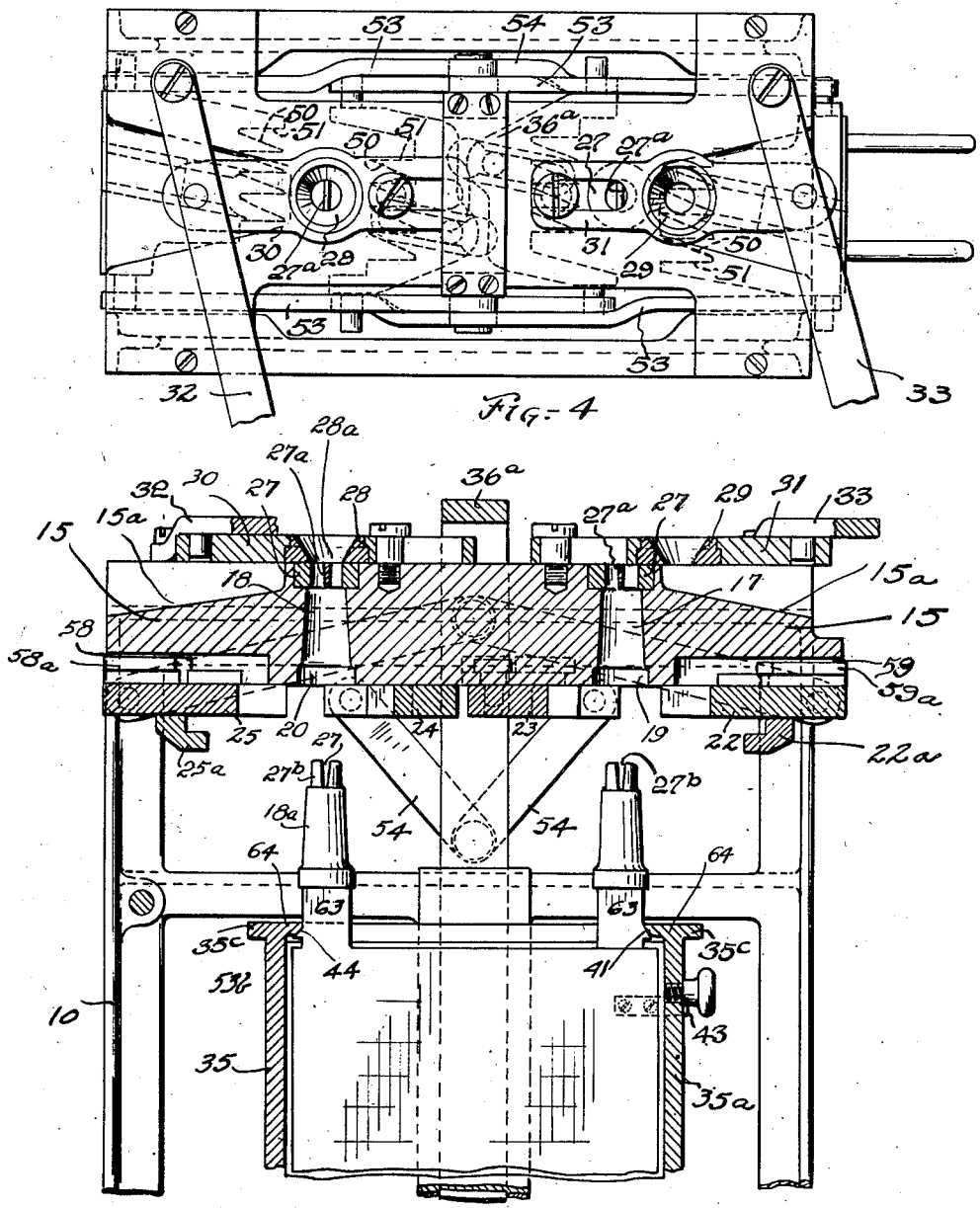

Patented July 7, 1925.

1,545,051

UNITED STATES PATENT OFFICE.

CLARENCE W. HAZELETT, OF LAKEWOOD, OHIO, ASSIGNOR, BY MESNE ASSIGNMENTS, TO THE CLEVELAND TRUST COMPANY, TRUSTEE, OF CLEVELAND, OHIO.

BATTERY BRIDGE TERMINAL LUG CASTING MACHINE.

Application filed February 26, 1921. Serial No. 448,229.

*To all whom it may concern:*

Be it known that I, CLARENCE W. HAZE-LETT, a citizen of the United States, residing at Lakewood, in the county of Cuyahoga and State of Ohio, have invented a certain new and useful Improvement in Battery Bridge Terminal Lug Casting Machines, of which the following is a full, clear, and exact description, reference being had to the accompanying drawings.

This invention is directed to improvements in a machine for the manufacture of storage batteries and is more particularly concerned with the provision of means for casting bridge connections between the positive plates and between the negative plates of storage battery elements.

The general object of my invention is to provide a machine in which the positive and negative plates of a storage battery element may be positioned and be properly spaced during a casting operation in which projecting lugs on the individual plates may be melted and fused by the casting metal to form efficient bus bar connections between the positive plates and the negative plates respectively.

A more particular object is to provide means in such a machine whereby the individual plates may be positively spaced, gaged and locked in uniform order during the casting operation. Another object is the provision of means whereby the battery terminals may be cast simultaneously with the casting of the bus bar connectors.

Still another object is to provide means whereby the surplus metal or fin may be sheared from the cast terminal lugs upon the completion of the casting operation. A further object is to arrange the means for the fulfillment of the foregoing objects in such a manner that the battery elements may be easily and readily removed from the moulding means after the individual plates have been joined into a unit element.

Other objects will be hereinafter set forth in the following description of the accompanying drawings, which show a preferred embodiment of my invention, the essential characteristics being summarized in the claims.

Figure 1:
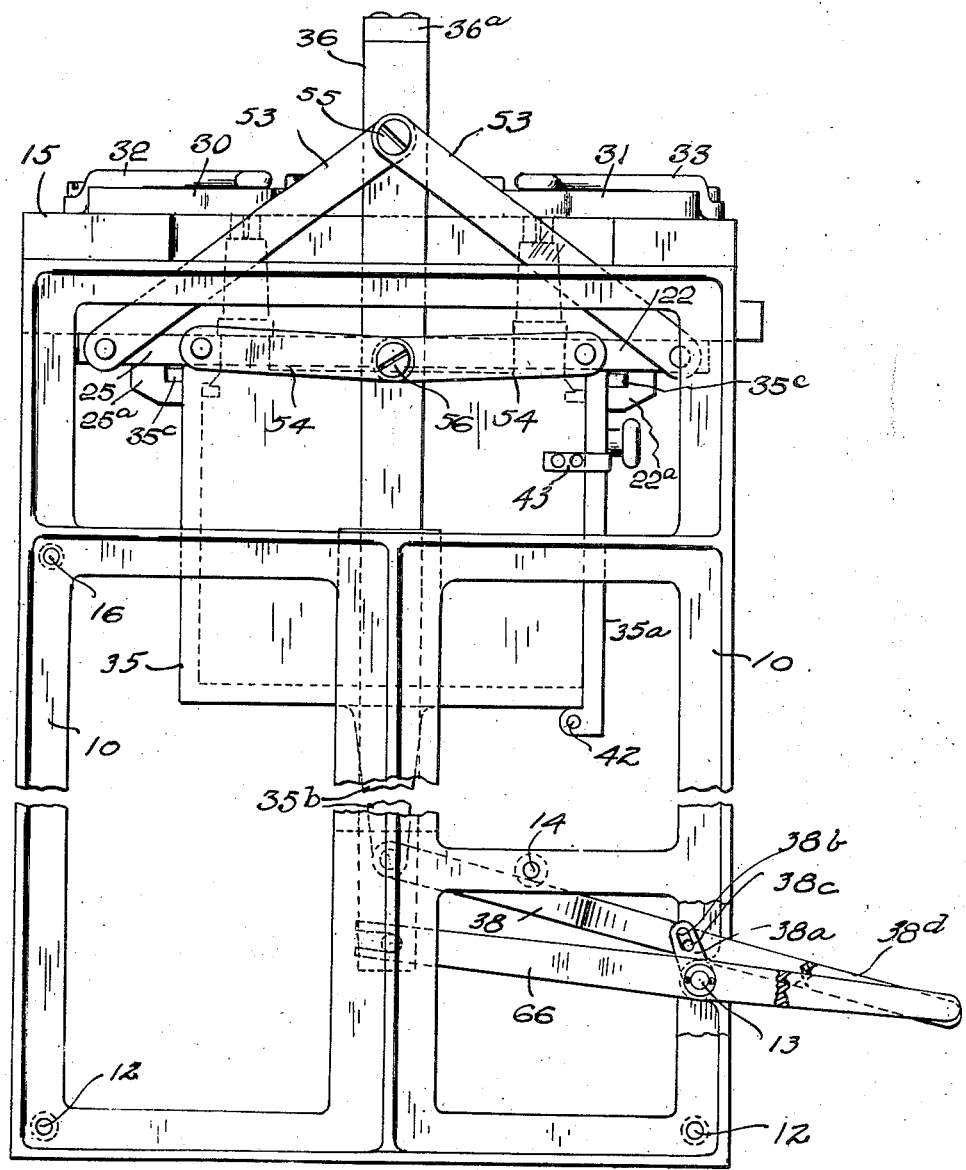
Figure 2:
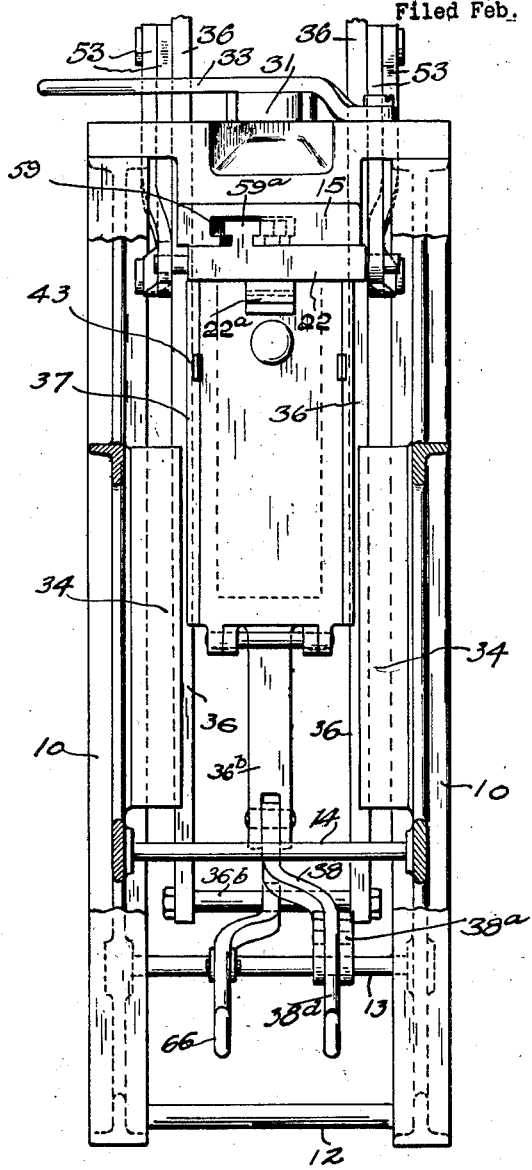
Figure 3:
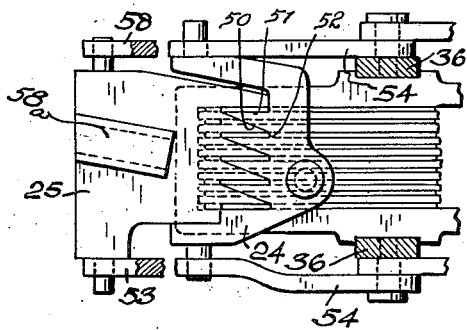
Figure 6:
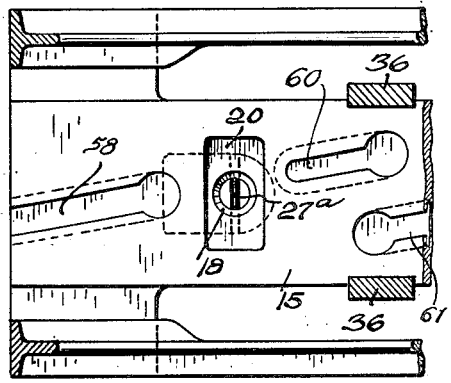
Figure 7:
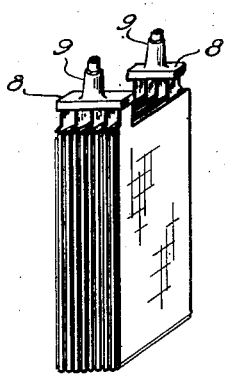

In the drawings, Fig. 1 is a side elevation of a machine embodying my invention while Fig. 2 is a front elevation thereof. In Fig. 3 I have shown a fragmentary sectional plan view of the lug locking means for positively spacing the battery plates. Fig. 4 is a plan view of my deivce showing the positions of the various parts after the locking and gagging means have been withdrawn from the casting plates, while Fig. 5 is a cross sectional elevation of the moulding means with the finished product in position to be removed from the machine and Fig. 6 is a bottom plan of a portion of the mould and associated parts. Fig. 7 is a perspective view of a battery element showing the finished product.

Referring to the various parts by numerals, in Figs. 1 and 2, I have shown a machine comprised substantially of upright frame members 10 rigidly secured by transverse spacing members 12, 13, 14 and 16, adapted to support a mould 15 secured to the upper ends and suspended therebetween. This mould member may be formed from a solid block of metal having tapered moulding cavities 17 and 18 extending into the transverse moulding cavities 19 and 20 located in the under side of the block. These cavities conform in general contour to the shape of the battery element parts 8 and 9 which my device is particularly adapted to mould.

It is desirable to have means co-operating with this mould member whereby the plates may be positioned with portions thereof projecting into the mould cavities, wherefore, I prefer to have spacing and locking comb members 22, 23, 24 and 25, adjacent to and slidably mounted on the under side of the mould. The comb members are of such shape that they may coact to seal the openings in the under side of the mould.

It is necessary to have suitable means co-operating with the upper surface of the mould for removing any surplus metal which may be protruding from the neck of the mould cavities after the casting operation. I therefore have provided shearing members 28 and 29, mounted on transversely movable slide members 30 and 31, the inner edges 28ª of which may co-operate with the upper edges of the core members 27 mounted on the mould member 15. Hence, to remove any surplus metal the members 30 and 31 may be shifted transversely of the mould openings by the levers 32 and 33. I have found that it is convenient to incorporate a pouring funnel with this shearing device and therefore have arranged the shearing member accordingly.

It is desirable to have the battery plate retaining means so placed that it will be accessible to the operator from the position he is in when manipulating the device and I therefore prefer to suspend a movable plate carrier 35 beneath the mould member 15 which may be maintained in a central position by the vertically movable members 36, the inner sides of which are adapted to slide in the slideways 37 integral with the plate carrier member 35 while the outer surfaces are adapted to slide in the slideways 34, secured to the frame members 10.

These slide members are maintained in a proper sliding relation to the frame and plate carrier by the spacing member 36ª rigidly secured to the upper ends thereof while a rod 36ᵇ serves as a spacing means as well as a connecting means for the shifting lever 66.

The carrier member may be shifted upwardly and downwardly in a vertical direction by the shifting member 38 acting upon the projecting lug 35ᵇ, extending from the under side of the plate carrier. This shifting member may be pivotally mounted on the bifurcated bearing member 38ª secured to the frame spacing member 13 with the outer end 38ᵇ projecting a sufficient distance from the pivotal center thereof to provide proper lever ratio for a ready manual movement of the carrier.

I prefer to have elongated openings 38ᵇ in which the lever pivot pin 38ᶜ may move at the beginning of the downward and upward motion of the lever 38 as considerable force is required for the starting of the downward movement of the plate carrier which may be obtained by permitting the lever 38 to bear upon the under side of the member 14.

I have arranged the plate carrier 35 in such a manner that the front portion 35ª may have a gaging effect upon the protruding plate gaging lugs 63, and a simple way of attaining this effect is to have the member 35ª pivotally mounted on the carrier at the lower end thereof as shown at 42. I have also provided suitable latching means 43 which serve to maintain this hinged member in position after the battery plates have been placed in the carrier 35, and by providing a tapered surface 41 on the upper edge of member 35ª, and a tapered surface 44 along the upper rear edge of the carrier 35, I may obtain a gaging effect upon the plates when the member 35ª is closed.

It is quite essential that the battery plates be uniformly spaced while in the plate carrier before the connecting bar 8 and terminal 9 are cast thereon. I have found that a very effective means for obtaining this result consists of arranging the battery comb members 22, 23, 24 and 25 in such a manner that, each individual tooth has a tapered surface 50 and a straight surface 51. That is, each series of teeth may have parallel sides and tapered sides which are adapted to coact. By thus arranging the combs, the teeth when approaching the lugs, function in the usual manner, namely, that the several points properly divide the plates, and also, upon bringing the combs together the tapered surfaces bear upon each other and act as cams to shift the combs transversely of their teeth, whereby the surfaces of the lugs are positively gripped on all sides and edges. The combs, when closed upon the lugs, present an impervious surface closing the mould and upon which molten metal may be cast without any resulting leaks.

A further advantage is to be seen in this arrangement in that the combs, which are shown in the sectional view in Fig. 3, may be accurately made with parallel inclined sides 50 and parallel longitudinal sides 51, from a solid piece of metal with the inner surfaces 52 lying in a single plane and of a width corresponding to the thickness of the battery plates.

To obtain the movement of these combs and to permit of their self-adjustment when acting upon the lugs, I have provided the link members 53 and 54 disposed in pairs on each side of the vertically movable member 36 and pivotally secured thereto above and below the plane of movement of the combs at 55 and 56 with their outer ends journaled on studs mounted on the comb members 22, 23, 24 and 25. Hence as the member 36 is shifted in an upward direction the outer comb members 25 and 22 are guided along undercut slots 58 and 59 by slide ribs 58ª and 59ª complementary thereto, while the inner comb members 23 and 24 are shifted in an outwardly direction along the similar undercut slots 60 and 61. These slots are disposed at an angle to the straight sides 51 of the comb teeth, which angle is approximately equal to one-half of the angle of the tapered sides of the teeth, for the purpose of having the comb teeth approach the sides of the plate lugs at a slight angle. Hence the sliding portions of the combs are loosely fitted therein so that they may therefor adjust themselves to the surfaces of the lugs with the least movement.

The operation of the mechanism is as follows:

A series of positive and negative battery plates may be placed within the casing member 35, with the separators assembled therebetween after which the front open side of the plate carrier may be closed by the pivotally mounted member 35ª, the latter part of the movement of this member acting to gage the plates longitudinally by bearing upon the tapered portions 41ª and 44ª of the battery plate lugs 63. The plate carrier may then be shifted in an upward direction by the shifting lever 38 until the top surface 64 of the carrier abuts the lower surfaces of the comb members 22 and 25 after which the slide member 36 operating the comb links 53 and 54, may be also moved in a vertical direction by a shifting lever as at 66 which is pivotally mounted directly upon the frame member 13, said latter member having its inner end bifurcated and co-operating with the member 36ᵇ.

I have provided locking portions 22ª and 25ª integral with the comb members 22 and 25, which are positioned to act upon the flanged portions 35ᶜ of the plate carrier 35 and maintain it in an elevated position during the casting period. Hence the comb members 22, 25, 23 and 24, are consequently advanced towards each other and act upon the sides of the plate lugs as the inclined surfaces 50 of the respective comb members slide upon each other. Upon the completion of this transverse movement of the comb members the lugs will have been uniformly spaced with the ends protruding into the mould cavities 19 and 20 and all openings between the lugs and the combs will have been closed.

I prefer to slidably mount these comb members upon the moulding block in the manner described in order to obtain intimate contact between the upper surfaces of the comb members and lower surfaces of the moulding block 15 so that when the molten metal is subsequently poured into the mould the flow of the metal will be restricted and confined to the immediate space surrounding the upper portions of the plate lugs which protrude through the comb members. The comb members and moulding block 15 may be maintained at a proper temperature to insure the ready flow of the molten metal but not of such a temperature as to cause a fusing of the portions of the lugs 63 in intimate contact with the teeth of the comb members, hence the molten metal will act upon the protruding portions of the lugs and cause them to fuse into the poured metal.

I have provided the gate members 27 with a transverse portion 27ª extending across the bore thereof which serves as a core to cast a slot 27ᵇ in the upper restricted portion 27ᶜ of the battery terminal 18ª. After the metal has cooled sufficiently to solidify, the shearing members 30 and 31 may be shifted in an outward direction and any surplus metal protruding above the core 27ª of the gate 27, will be severed from the terminal by the shearing edge 28ª of the shearing member 28 and the severed portion may then be carried along the top of the mould block 15 and being of soft metal may be readily punched through and deposited in the inclined guideway 15ª from which it may fall by gravity into any suitable receptacle.

As the metal cools it shrinks from the surfaces of the mould and the completed element may then be lowered in the casing by shifting the member 36 in a downwardly direction, the lever 38 being momentarily fulcrumed on the rod 14, thereby causing the recession of the comb members from the battery element, after which the carrier may be lowered by shifting the lever 38 downwardly. The battery element may then be removed from the carrier by releasing the latch members 43, thus permitting the movable side 35ª to be swung outwardly.

From the foregoing description of my device it is to be seen that by its use in the process of manufacturing batteries, battery plates may be quickly and easily welded together, without necessitating the use of burning torches or similar appliances with a consequent uniformity of the product, for the plate carrier serves as a gage to positively locate plates in a longitudinal direction, while the comb members serve to positively locate the plates in a transverse direction. The distances between the terminals cast on the elements are definitely and positively fixed with the result that no difficulty is experienced in the final assembling of the battery element, jar and cover. Likewise a uniform electrical connection of each plate with the terminal is assured as the casting metal is of a fairly even temperature throughout, and as the melted portions of the lugs become fused therewith an integral connection is obtained between all of the positive plates and also between all of the negative plates. Furthermore the device is simple in character in comparison to the results obtained and may be easily manipulated by an inexperienced operator.

Having thus described my invention, I claim:—

1. In a machine of the character described, the combination of a mould member, interengaging members adapted to coact and close an opening of the mould and to exert pressure upon the sides of battery plates positioned within the machine and means for operating said interengaging members.

2. In a machine of the character described, the combination of a casting mould, a series of battery plates having portions thereof projecting into a cavity of the mould and means adapted to grip the side surfaces of said portions and close said mould cavity.

3. In a machine of the character described, the combination of a mould member having an opening therein, interengaging members having beveled teeth adapted to uniformly space the lugs of a series of battery plates positioned within the machine and close said mould opening and to be disposed between the lugs to grip the side surfaces thereof, whereby said lugs may extend through an impervious moulding surface formed by the interengaging members.

4. In a machine of the character described, the combination of means for contiguously moulding battery plate connectors and terminal lugs on a series of positive plates and a series of negative plates interleaved therewith, and means for positively spacing and positioning the plates, said latter means including pairs of interengaging comb members having a series of uniformly spaced teeth adapted to coact and grip said battery plates, in a direction transverse to the plate surfaces.

5. In a machine of the character described, the combination of means for simultaneously moulding and welding bus-bar connectors onto a series of positive plates and a series of negative battery plates interleaved therewith, including means for moulding terminal lugs integral with the connectors, means for supporting and positioning said plates with portions thereof extending into mould cavities in said moulding means and means for positively gripping and spacing said extending portions on the battery plates, whereby said lugs may be autogenously welded to the bus-bar connectors, said gripping means acting transversely of the flat surfaces of the plate lugs.

6. In a machine of the character described, the combination of a carrier member adapted to support a series of battery plates having separators therebetween, means for actuating said carrier, a mould member having a plurality of battery terminal moulding cavities, and means cooperating with the mould for uniformly spacing lugs on the battery plates, said latter means being adapted to positively grip the flat surfaces of said lugs and to close the openings of said moulding cavities.

7. In a machine of the character described, the combination of a mould member, having a plurality of terminal lug moulding cavities and bus-bar moulding cavities communicating therewith, means for supporting and positioning a series of positive and negative battery plates within the machine, means for operating said supporting and positioning means, means cooperating with the mould for gripping the sides of the battery plates and for closing the openings of said moulding cavities and means connected with said mould for casting slotted ends on said terminal lugs.

8. In a machine of the character described, the combination of means for simultaneously welding and moulding battery plate connectors onto a series of positive plates and a series of negative plates interleaved therewith, and means for positively spacing and positioning said plates, said latter means including pairs of interengaging comb members having a series of uniformly spaced teeth adapted to coact and grip extending lugs on the battery plates near the ends thereof and shiftable means for the comb members adapted to permit a transverse movement of the comb members relative to the major surfaces of the plates.

9. In a machine of the character described, the combination of a carrier member adapted to support two series of mutually assembled battery plates, a mould member having a pair of battery terminal moulding cavities, means for causing a relative movement between the mould and carrier members, means cooperating with the mould for uniformly spacing terminal lugs on the battery plates, said latter means including comb members having a series of interengaging teeth, adapted to grip the flat sides of said battery plates and to close the openings of said moulding cavities the comb members being mounted on the device in such manner as to permit a transverse movement of the teeth relative to the plate surfaces.

10. In a machine of the character described, the combination of a mould member, having a plurality of terminal lug moulding cavities, bus-bar moulding cavities communicating to the aforesaid cavities, means for supporting and positioning a series of positive and negative battery plates with portions thereof extending into said moulding cavities, means for operating said supporting and positioning means, means cooperating with the mould for gripping said extending portions of the battery plates, said latter means having moulding surfaces closing the openings of said moulding cavities and means connected with said mould for casting slotted ends on said terminal lugs.

11. In a machine of the character described, the combination of moulding means for casting terminal lugs and bus-bar connectors on a series of positive and negative battery plates, while the separators are assembled therebetween, means for supporting and positioning said battery plates including a carrier adapted to gage the plate longitudinally, means for gaging the protruding lugs on said battery plates comprised substantially of relatively movable pairs of interengaging members having series of interlocking teeth between the sides of which said plate lugs are adapted to be gripped, the teeth of each member having wedge surfaces engaging similar surfaces on the teeth of the other member.

12. In a machine of the character described, the combination of a support for battery plates having flanges to engage and position the terminal lugs on the respective plates, a mold member above the support, means for raising the support to coact with the mold member, and hooked lugs adapted to engage lugs on the battery support to hold the latter in co-operation with the mold member.

13. In a machine of the character described, the combination with a support adapted to carry positive and negative battery plates in assembled relation, a mold member having a pair of casting openings for each connector lug and bus bar, said openings being spaced with relation to the position occupied by the positive and negative connectors respectively when the plates are assembled, means for moving the assembled plates into coaction with the mold members, and comb members having the teeth thereof interengaging for properly spacing individual terminal lugs and for closing the mold between such lugs, the teeth of the comb members having wedge surfaces engaging between the lug portions of the plates.

14. In a machine of the character described, the combination of a receptacle for assembled positive and negative battery plates, a mold having a pair of casting cavities, lug positioning means on the under side of said mold comprising two pairs of mutually movable coacting combs, four links for moving said combs, there being a loose connection between the links and combs to permit a transverse movement of the combs relative to the flat surfaces of the plate lugs, a movable member to which the inner ends of said links are pivoted, and mechanism for simultaneously moving the receptacle and said movable member.

15. In a machine of the character described, means for supporting a group of battery plates having lugs, a pair of interengaging comb members, said comb members being shiftable toward and away from each other, and transversely of the comb teeth, said teeth having gripping surfaces extending parallel to the flat surfaces of the plate lugs when the plates are being supported by said means, and parallel wedging surfaces adapted to engage each other between the plate surfaces being gripped by the teeth.

In testimony whereof, I hereunto affix my signature.

CLARENCE W. HAZELETT.